United States Patent [19]

Shigeo

[11] 4,442,865
[45] Apr. 17, 1984

[54] MECHANISM FOR CHANGING OVER FLUID PASSAGES

[75] Inventor: Nakashima Shigeo, Muko, Japan

[73] Assignee: Nakashima Seisakusho Co., Ltd., Kyoto, Japan

[21] Appl. No.: 314,001

[22] Filed: Oct. 21, 1981

[30] Foreign Application Priority Data

Nov. 14, 1980 [JP] Japan .................. 55-161288

[51] Int. Cl.³ ............................................ F16K 11/06
[52] U.S. Cl. ..................... 137/874; 137/625.46; 137/876; 406/182
[58] Field of Search .............. 137/625.45, 625.46, 137/872, 874, 875, 876; 193/31 A; 406/156, 181, 182

[56] References Cited

U.S. PATENT DOCUMENTS

| 2,586,144 | 2/1952 | Benoit ......................... 193/31 A X |
| 3,132,669 | 5/1964 | Feldsted ....................... 137/874 X |
| 3,146,033 | 8/1964 | Larsson ........................ 406/182 |
| 3,527,252 | 9/1970 | Cook et al. ................... 137/874 |
| 3,590,872 | 7/1971 | Baity .......................... 137/625.46 |
| 3,902,682 | 9/1975 | Woll ........................... 137/874 X |
| 4,157,848 | 6/1979 | Smoot .......................... 406/182 |
| 4,189,261 | 2/1980 | Kelley et al. .................. 137/874 X |

Primary Examiner—Gerald A. Michalsky
Attorney, Agent, or Firm—Wenderoth, Lind & Ponack

[57] ABSTRACT

A fluid-passages change-over mechanism for transmitting powdery or granular material comprises a circular casing, a circular rotating plate having a drivable center axle rotatably admitted within the casing and a casing cover, and a swing pipe mounted on the circular rotating plate which extends through an arc-shaped opening in the cover. The mechanism further comprises an A circuit pipe and a B circuit pipe both fixed on an arc of the same radius from the axis of the circular casing. In operation, the A circuit pipe or the B circuit pipe communicates with the swing pipe through a reciprocating constant angle rotation of the circular rotating plate to change-over the powdery or granular material.

2 Claims, 8 Drawing Figures

MECHANISM FOR CHANGING OVER FLUID PASSAGES

This invention relates to a mechanism for changing over fluid passages and, more particularly, a fluid-passages change-over mechanism which is mainly provided in a pipe for transferring a powdery or granular material.

BACKGROUND OF THE INVENTION AND PRIOR ART

A fluid-passage change-over mechanism, such as shown in FIG. 1, was heretofore used in handling a powdery or granular material. In FIG. 1, a main pipe 2 is connected to the inlet side (the left side in the figure) of a change-over mechanism 1 of a Y type and two circuit pipes 3 and 4 are, respectively, connected to the outlet side (the right side in the figure) of the change-over mechanism 1. Change-over mechanism 1 of such type as referred to above was manufactured and sold with the cross section thereof formed in a square hollow shape for reasons of function and machining. A change-over valve 5 of a square shape is provided within a pipe with the section thereof formed as a square and hollow shape and is combined with a driving arm 7 of a driving mechanism, such as an air cylinder 6, which is provided outside change-over mechanism 1. Change-over valve 5 swings around a pivot 8 by an actuation of air cylinder 6 to change-over the powdery or granular material which is transferred from main pipe 2 to circuit pipe 3 or 4.

In the example stated above, since main pipe 2 with the section thereof formed as a circular shape must be connected to change-over mechanism 1 with the section thereof formed in a square hollow shape at the inlet side of change-over mechanism 1 and circuit pipes 3 and 4 with the section thereof formed as a circular shape must be connected to change-over mechanism 1 with the section thereof having a square hollow shape at the outlet side of change-over mechanism 1, it is necessary that end surfaces 2', 3' and 4' of the respective main pipe 2, circuit pipe 3 and circuit pipe 4 are made square and hollow at the connecting sides of the pipes to change-over mechanism 1. Accordingly, one end 2" of main pipe 2 is made circular in cross section and the other end surface 2' of main pipe 2 is made square in cross section, one end 3" of circuit pipe 3 is made circular in cross section and the other end surface 3' of circuit pipe 3 is made square in cross section and also one end 4" is made circular and the other end surface 4' is made square. This means that all the pipes should have their other end surfaces made square as well as their one end made circular, all in cross section. This special configuration raises the the cost of manufacturing the pipes and a relatively large space is needed to accommodate the pipes including the change-over mechanism. According to the mechanism of the example stated above, some faults were recognized in that the fluid as the transporting media (such as air or liquid) is liable to be short-circuited under a pressurized transportation to decrease the transporting efficiency.

BRIEF SUMMARY OF THE INVENTION

This invention aims to realize a simple fluid-passages change-over mechanism which has an extremely thin construction and operates reliably without accompanying any leakage of the powdery or grannular material so that the defects in the prior art are eliminated.

The apparatus provided according to the invention comprises a circular casing, a circular rotating plate with a center axle rotatably admitted within a casing cover with an opening, an A circuit pipe and a B circuit pipe both fixed adjacently on an arc of the same radius as that of said circular casing, a swing pipe mounted on said circular rotating plate and a flexible pipe connecting said swing pipe with a main pipe.

BRIEF DESCRIPTION OF THE DRAWINGS

The invention will now be described in greater detail with reference to the accompanying drawings, in which.

DETAILED DESCRIPTION OF THE INVENTION

Figure 1:
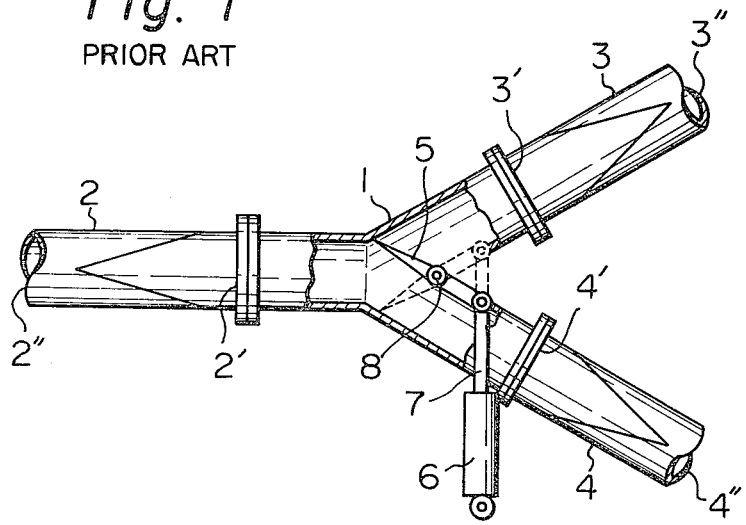
FIG. 1 is a plan view of a fluid-passage change-over mechanism of the prior art.
Figure 2:
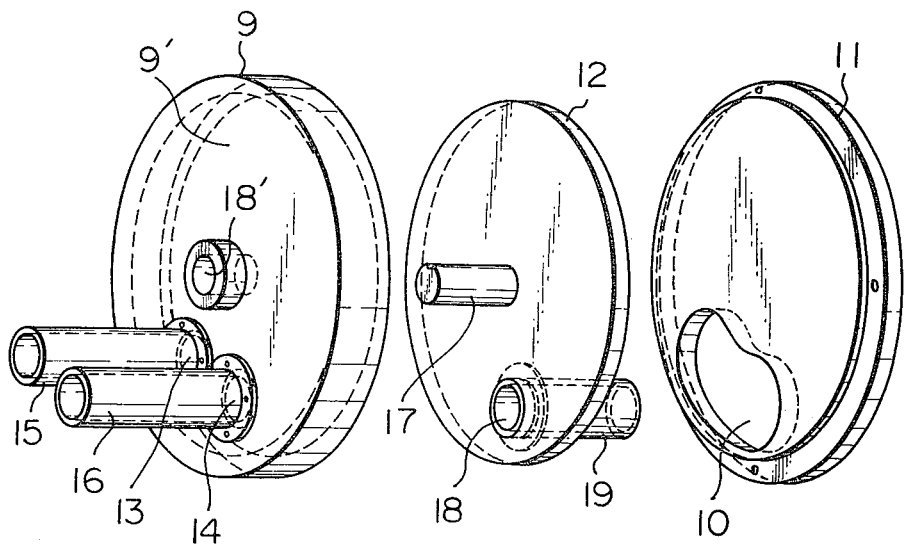
FIG. 2 is an exploded perspective view of an embodiment of the fluid-passages change-over mechanism provided according to the invention.
Figure 3:
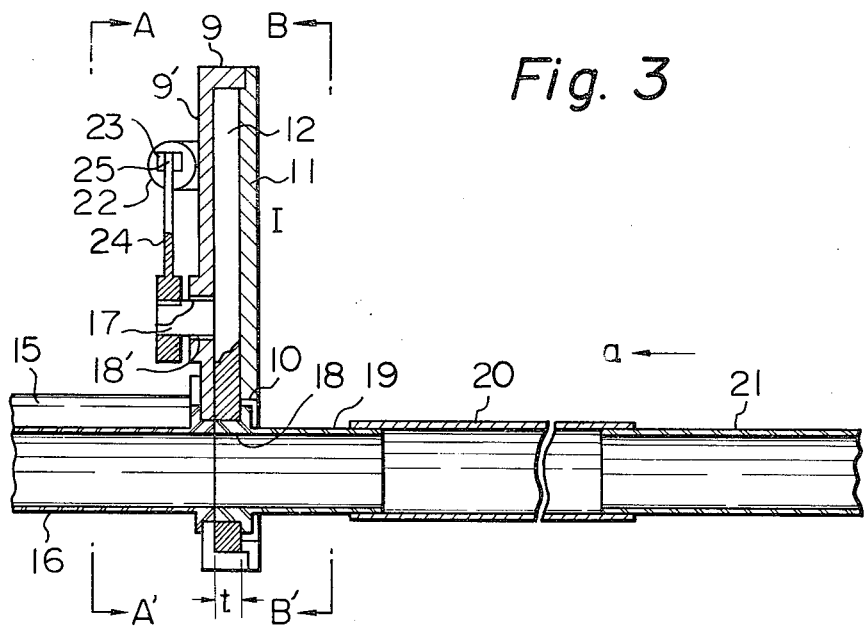
FIG. 3 is a side sectional view of the embodiment shown in FIG. 2, FIG. 4 and FIG. 5 are, respectively, sectional views taken along lines A, A' and B, B' both in FIG. 3.
Figure 4:
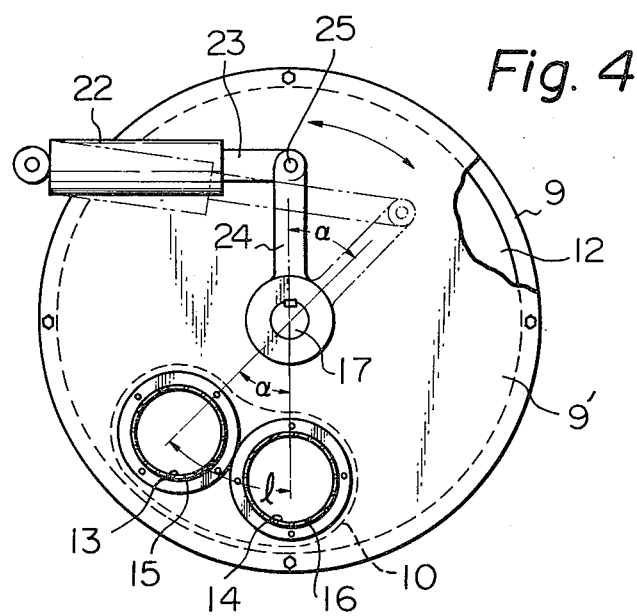
Figure 5:
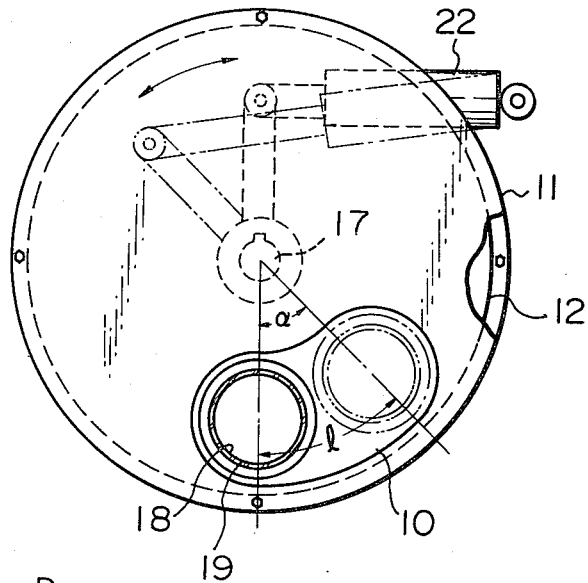

In FIGS. 2 to 5, a casing assembly I is comprised of a circular casing 9 and a casing cover 11 with an opening 10 of a cocoon shape passing therethrough, said circular casing 9 and said casing cover 11 overlapping and being fixed to each other. A circular rotating plate 12 is received in the circular space provided within the casing assembly I to be rotated around the axes of circular casing 9 and casing cover 11.

An A circuit pipe 15 and a B circuit pipe 16 are respectively mounted to circular casing 9 so as to cover a hole 13 and a hole 14 which are provided on a front surface 9' of circular casing 9, said A circuit pipe 15 and said B circuit pipe 16 projecting outward from front surface 9'. A circuit pipe 15 and B circuit pipe 16 are located adjacently at a radius of the same distance from the axis of circular casing 9. Holes 13 and 14 are of course also located adjacently at the same radius. A center axle 17 of circular rotating plate 12 passes through a guiding bore 18' which is provided at the center of circular casing 9 to be formed to project from front surface 9' of circular casing 9. A bore 18 provided in circular rotating plate 12 is connected to a swing pipe 19 so that by rotating the circular rotating plate 12, swing pipe 19 can be rotated into communication with either A circuit pipe 15 or B circuit pipe 16. Swing pipe 19 passes through opening 10 of casing cover 11 at one end to project from the other end outward. A main pipe 21 is connected to the other end of swing pipe 19 by means of a flexible pipe 20 of a suitable length. One end of a working arm 23 is admitted into a torque actuator 22, such as an air cylinder, which is attached to a suitable fixed structure, e.g. front surface 9' of casing 9. The other end of working arm 23 is connected to an end of a connecting lever 24, which is fixed to center axle 17 of circular rotating plate 12, through a pin 25.

The operation of the fluid-passages change-over mechanism of the invention is, hereinafter, explained with reference to the construction of the embodiment shown in FIGS. 2 to 5. When torque actuator 22 operates to move circular rotating plate 12 reciprocatingly around center axle 17 within a range defined by a constant angle α (this angle spans a circular arc l from the center of hole 13 to the center of hole 14 and is measured around center axle 17), swing pipe 19 also moves with circular rotating plate 12 along the circular arc l within opening 10 by the constant angle α. As swing pipe 19 communicates with either A circuit pipe 15 or B circuit pipe 16, the powdery or granular material which is pumped forcibly forward in the direction of arrow "a" within main pipe 21 can be changed-over to either A circuit pipe 15 or B circuit pipe 16 through swing pipe 19.

Figure 6:
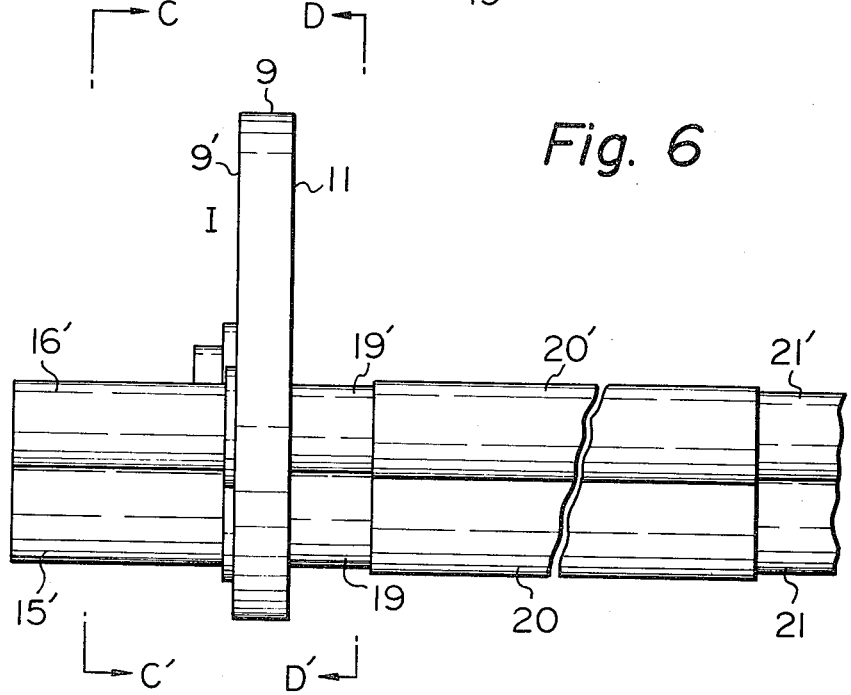
FIG. 6 is a side sectional view of another embodiment of the fluid-passages charge-over mechanism provided according to the invention.
Figure 7:
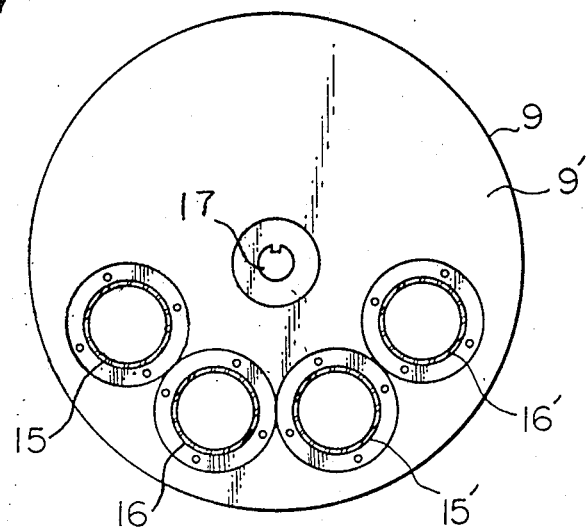
FIG. 7 and FIG. 8 are, respectively, sectional views taken along lines C, C' and D, D' both in FIG. 6.
Figure 8:
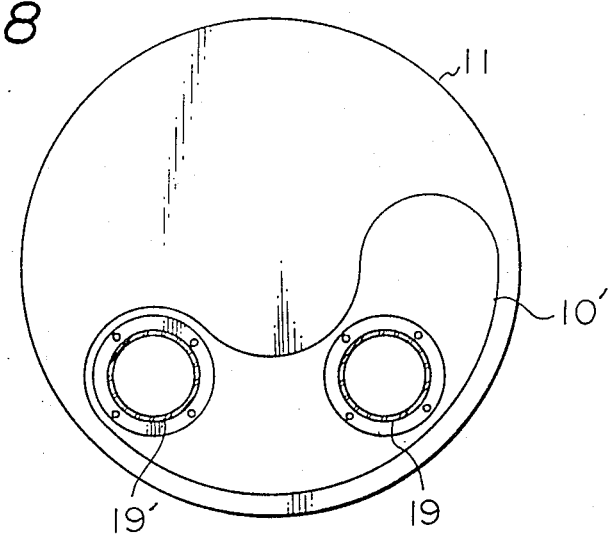

In the embodiment shown in FIGS. 2 to 5, two circuit pipes are illustrated and in the embodiment shown in FIGS. 6 to 8, a plurality of circuit pipes, such as a combination of an A circuit pipe 15 and a C circuit pipe 15' and a combination of a B circuit pipe 16 and a D circuit pipe 16', and a plurality of swing pipes, such as a combination of a swing pipe 19 and another swing pipe 19' are illustrated. Under this condition, a fluid passage from main pipe 21 can be changed-over to one of A circuit pipe 15 or B circuit pipe 16 through swing pipe 19 and, at the same time, a fluid passage from main pipe 21' can be changed-over to one of C circuit pipe 15' or D circuit pipe 16' through swing pipe 19'.

The operational effects of the invention will be realized in the field of transferring powdery or granular material using a fluid-passages change-over mechanism with a high pressure as well as with a low pressure, which could not be realized in a fluid-passages change-over mechanism found in the prior art. The efficient effect developed by the invention is explained in the following:

(1) The entire fluid-passage change-over is put into practice by changing-over and by connecting a main pipe and a plurality of circuit pipes, all of them having circular sections. Circular rotating plate 12 moves rotatably in a direction perpendicular to the direction of forcible transferring of the powdery or granular material at the time of change-over of the fluid passage and, therefore, only a very small torque is required to move circular rotating plate 12. As the thickness t of circular rotating plate 12 can be made extremely thin, the overall size of the fluid-passage change-over mechanism is quite compact and easy to be handled so that the mechanism is suitable for mass production.

(2) Circular rotating plate 12 is admitted within a circular space of casing assembly I which comprises by circular casing 9 and casing cover 11. In the circular space, circular rotating plate 12 contacts tightly circular casing 9 and casing cover 11 and some media for sealing them can easily be added thereto. No leakage of the powdery or granular material, including the transporting media, can occur between the connecting parts between bore 18 of swing pipe 19 and hole 13 or 14 of circuit pipe 15 or 16 in a casing assembly I at the time of transferring the powdery or granular material and at the time when circular rotating plate 12 rotates and moves for changing over the fluid passages. Therefore, the fluid-passages change-over motion can be carried out smoothly in a high pressure transfer of the powdery or granular material.

What is claimed is:

1. A fluid passages change-over mechanism, comprising:
   a circular casing having a central opening;
   a circular rotating plate axially aligned with said casing, having an axle extending outwardly from the center of one side thereof through said central opening in said casing so as to be rotatable therein about an axis rotation;
   a circular casing cover axially aligned with said casing and said plate, having an arc-shaped opening surrounding said axis of rotation at a constant radial distance therefrom; said casing having first and second holes along a first arc about said axis, said first arc having a radius equal to said constant radial distance, said plate having a third hole at a distance equal to said constant radial distance from said axis, said plate being disposed between said casing and said cover so to be covered thereby;
   first and second circuit pipes respectively mounted at one end to said casing in alignment with said first and second holes, the other end of said circuit pipes extending away from said plate;
   one swing pipe mounted at one end thereof to said plate in alignment with said third hole, the other end of said one swing pipe extending through said arc-shaped opening so as to be rotatable with said plate between opposite circumferential ends of said arc-shaped opening, said one swing pipe respectively communicating with said first and second circuit pipes through said first and second holes when said one swing pipe is at the respective opposite ends of said arc-shaped opening;
   a main pipe;
   a flexible pipe connecting said other end of said one swing pipe to one end of said main pipe; and
   torque means, connected to said axle, for reciprocally rotating said one swing pipe with said plate between said opposite ends of said arc-shaped opening.

2. A fluid-passages change-over mechanism as recited in claim 1, further comprising another first circuit pipe and another second circuit pipe, another swing pipe, another flexible pipe and another main pipe, all of them being constructed in the same manner as those of the corresponding members, whereby said first circuit pipe or said second circuit pipe communicates with said one swing pipe at the same time said another first circuit pipe or said another second circuit pipe does with said another swing pipe.

* * * * *